W. F. YEAGER.
Plow.
No. 26,390.
Patented Dec. 6, 1859.
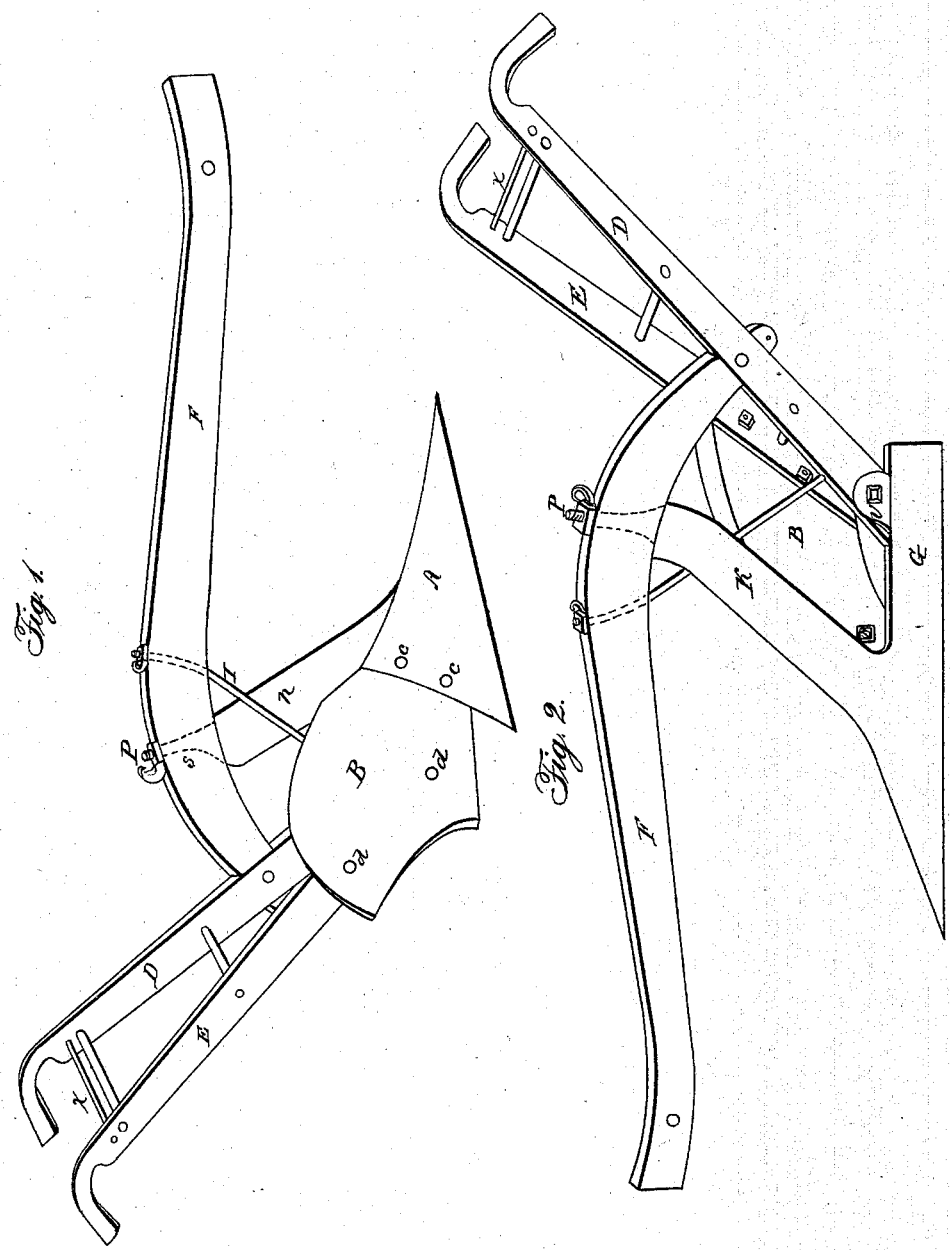

UNITED STATES PATENT OFFICE.

WILLIAM F. YEAGER, OF STARKVILLE, MISSISSIPPI.

IMPROVEMENT IN PLOWS.

Specification forming part of Letters Patent No. 26,390, dated December 6, 1859.

*To all whom it may concern:*

Be it known that I, WILLIAM F. YEAGER, of Starkville, in the county of Oktibbeha and State of Mississippi, have invented a new and useful Improvement in Plows; and I do hereby declare the following to be a full and exact description thereof, reference being had to the drawings, and to the letters of reference marked thereon.

Figure 1 is a perspective view of one side of the plow. Fig. 2 is a perspective view of the reverse side.

The landside G, lug U, shank S, share A, and cutter K of this plow are composed of one piece of metal, as seen in the drawings.

The mold-board B, which is of wood, is attached to the share A by two screw-bolts, *c c*, as shown in Fig. 1.

The letters *d d* represent the bolts attaching B to a handle of the plow.

From the lower part of the handle D a rod, T, passes to and through the beam F, on the end of which is a screw-nut for the purpose of bracing and securing the parts of the plow in place. The upper end, S, of the cutter K also passes through the beam F, to which it is secured by a screw, P, on top, as seen in the drawings.

What I claim as my invention, and desire to secure by Letters Patent, is—

The arrangement of the landside G, the shank S, bolt P, brace T, lug U, beam F, brace X, handles E D, share A, cutter K, and mold-board B, the whole being constructed as described, for the purposes set forth.

WILLIAM F. YEAGER.

Witnesses:
A. J. MAXWELL,
JOHN W. MOSEBY.